United States Patent
Choi et al.

(10) Patent No.: US 9,852,403 B2
(45) Date of Patent: Dec. 26, 2017

(54) FILE ATTACHMENT METHOD AND ELECTRONIC DEVICE THEREOF

(71) Applicant: Samsung Electronics Co., Ltd., Gyeonggi-do (KR)

(72) Inventors: Bo-Kun Choi, Seoul (KR); Ki-Dong Hong, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 165 days.

(21) Appl. No.: 14/329,523

(22) Filed: Jul. 11, 2014

(65) Prior Publication Data
US 2015/0019942 A1    Jan. 15, 2015

(30) Foreign Application Priority Data
Jul. 12, 2013 (KR) .......................... 10-2013-0082275

(51) Int. Cl.
*G06F 17/30* (2006.01)
*G06Q 10/10* (2012.01)

(52) U.S. Cl.
CPC .................................. *G06Q 10/107* (2013.01)

(58) Field of Classification Search
CPC ............. G06F 17/2235; G06F 17/2247; G06F 17/212; G06F 17/24; G06F 17/211; G06F 17/30882; G06F 17/3089
USPC ....................................... 715/205, 800, 202
See application file for complete search history.

(56) References Cited

U.S. PATENT DOCUMENTS

| | | | | |
|---|---|---|---|---|
| 6,892,239 B1 * | 5/2005 | Kirkeby | ............. | H04L 12/5835 358/402 |
| 6,914,693 B1 * | 7/2005 | Kirkeby | ............. | H04N 1/00204 358/1.15 |
| 7,593,991 B2 * | 9/2009 | Friedman | ............. | G06Q 10/107 709/206 |
| 8,590,016 B2 * | 11/2013 | Kim | ...................... | G06F 21/568 709/206 |
| 8,775,520 B1 * | 7/2014 | Lewis | ..................... | H04L 51/08 709/206 |
| 2002/0016818 A1 * | 2/2002 | Kirani | ............... | G06F 17/30902 709/203 |
| 2002/0035576 A1 * | 3/2002 | Kishimoto | ............ | H04L 51/066 |
| 2004/0052433 A1 * | 3/2004 | Henry | ............... | G06F 17/30663 382/305 |
| 2005/0073665 A1 * | 4/2005 | Taniguchi | .............. | G03B 27/42 355/53 |
| 2005/0144233 A1 * | 6/2005 | Kjesbu | ................... | H04N 7/147 709/204 |
| 2006/0069990 A1 * | 3/2006 | Yozell-Epstein | .... | G06Q 10/107 715/273 |
| 2006/0143153 A1 * | 6/2006 | Mifune | ............. | G06F 17/30011 |
| 2007/0233791 A1 * | 10/2007 | Sylthe | .................. | G06Q 10/107 709/206 |
| 2008/0049192 A1 * | 2/2008 | Nozaki | .................. | G03B 17/00 353/25 |
| 2009/0150419 A1 * | 6/2009 | Kim | ...................... | G06F 21/568 |

(Continued)

FOREIGN PATENT DOCUMENTS

KR    10-2011-0013264    2/2011

*Primary Examiner* — Scott Baderman
*Assistant Examiner* — Hassan Mrabi

(57) ABSTRACT

A method for operating an electronic device includes attaching a file to a first application program; generating an image corresponding to the file; and inserting the image into the first application program.

18 Claims, 16 Drawing Sheets

(56) References Cited

U.S. PATENT DOCUMENTS

| | | | |
|---|---|---|---|
| 2010/0162183 A1* | 6/2010 | Crolley | G06F 17/30864 715/867 |
| 2012/0010995 A1* | 1/2012 | Skirpa | G06F 3/0481 705/14.49 |
| 2012/0030567 A1* | 2/2012 | Victor | G06F 3/0482 715/702 |
| 2012/0226760 A1* | 9/2012 | Lewis | G06Q 10/107 709/206 |
| 2013/0332850 A1* | 12/2013 | Bovet | G06F 3/0488 715/752 |
| 2014/0115495 A1* | 4/2014 | Wetherell | G06F 17/30705 715/752 |
| 2014/0122620 A1* | 5/2014 | Lin | G06Q 10/107 709/206 |
| 2015/0200885 A1* | 7/2015 | Sharp | H04L 51/08 709/206 |

* cited by examiner

FILE ATTACHMENT METHOD AND ELECTRONIC DEVICE THEREOF

PRIORITY

The present application is related to and claims priority under 35 U.S.C. §119 to an application filed in the Korean Intellectual Property Office on Jul. 12, 2013 and assigned Serial No. 10-2013-0082275, the contents of which are incorporated herein by reference.

TECHNICAL FIELD

The present disclosure relates to a technology regarding an attached file in an application program such.

BACKGROUND

Portable terminals have become necessary articles of modern persons due to their portability, and evolve into multimedia devices that provide various services such as voice and video call functions, an information input/output function, and a data transmission/reception function.

Of various services, a function of attaching a file to an e-mail and transmitting the file to a receipt is very useful. In this embodiment, an electronic device's user may attach various types of files (for example, test, image and moving images) to an e-mail and transmit the e-mail.

Due to the development of SNS, e-mails seem to be less necessary or important, but contacts for official business are still made through e-mails not SNS.

Recently, company affairs have been increasingly conducted by using a portable electronic device. SI companies including major companies have started to support Intranet services covered by security settings through portable electronic devices of employees. E-mails are the start of such Intranet services, but companies have a problem that respective sensitive materials may lead to inadvertent disclosure to the outside. In a case of accessing a company's e-mail server through a portable electronic device from the outside, there are limitations except for simply checking and replying e-mails and a function of opening an attached file may be restrictively allowed to use.

Therefore, there is a need for a method for checking a file attached to an e-mail in an electronic device.

SUMMARY

To address the above-discussed deficiencies, it is a primary object to provide a method and apparatus for performing file attachment in an electronic device.

Another object of the present disclosure is to provide a method and apparatus for generating an image corresponding to an attached file in an electronic device.

Another object of the present disclosure is to provide a method and apparatus for determining the number of images in a case of generating an image corresponding to an attached file in an electronic device.

Another object of the present disclosure is to provide a method and apparatus for determining image quality in a case of generating an image corresponding to an attached file in an electronic device.

Another object of the present disclosure is to provide a method and apparatus for executing an application program for supporting an attached file in order to generate an image corresponding to the attached file in an electronic device.

Another object of the present disclosure is to provide a method and apparatus for generating an image in the unit of a display buffer in the application buffer of an application program for supporting an attached file in an electronic device.

Another object of the present disclosure is to provide a method and apparatus for executing an application program for supporting an attached file in the background in an electronic device.

According to an aspect of the present disclosure, a method for operating an electronic device includes: attaching a file to a first application program; generating an image corresponding to the file; and inserting the image into the first application program.

According to another aspect of the present disclosure, an electronic device includes: at least one memory; and at least one processor for: attaching a file to a first application program; attaching a file to a first application program; generating an image corresponding to the file; and inserting the image into the first application program.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Disclosure embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

The present disclosure relates to a technology for generating an image corresponding to an attached file and inserting the image into a body of an e-mail which is an application program in an electronic device.

In the following description, examples of the electronic device may include a mobile communication terminal, a personal digital assistant (PDA), a laptop computer, a smart phone, a netbook, a television, a mobile internet device (MID), an ultra mobile personal computer (UMPC), a tablet PC, a navigation device, a digital refrigerator, a digital watch, and an MP3 player.

In the following description, a technology will be described which generates an image corresponding to an attached file and inserting the image into a body of an e-mail when file attachment is performed in an e-mail application program. Herein, the present disclosure will be described taking an e-mail application program of application programs capable of performing file attachment as an example, but the present disclosure is not limited thereto and may include other application programs capable of performing file attachment and transmission.

Figure 1:
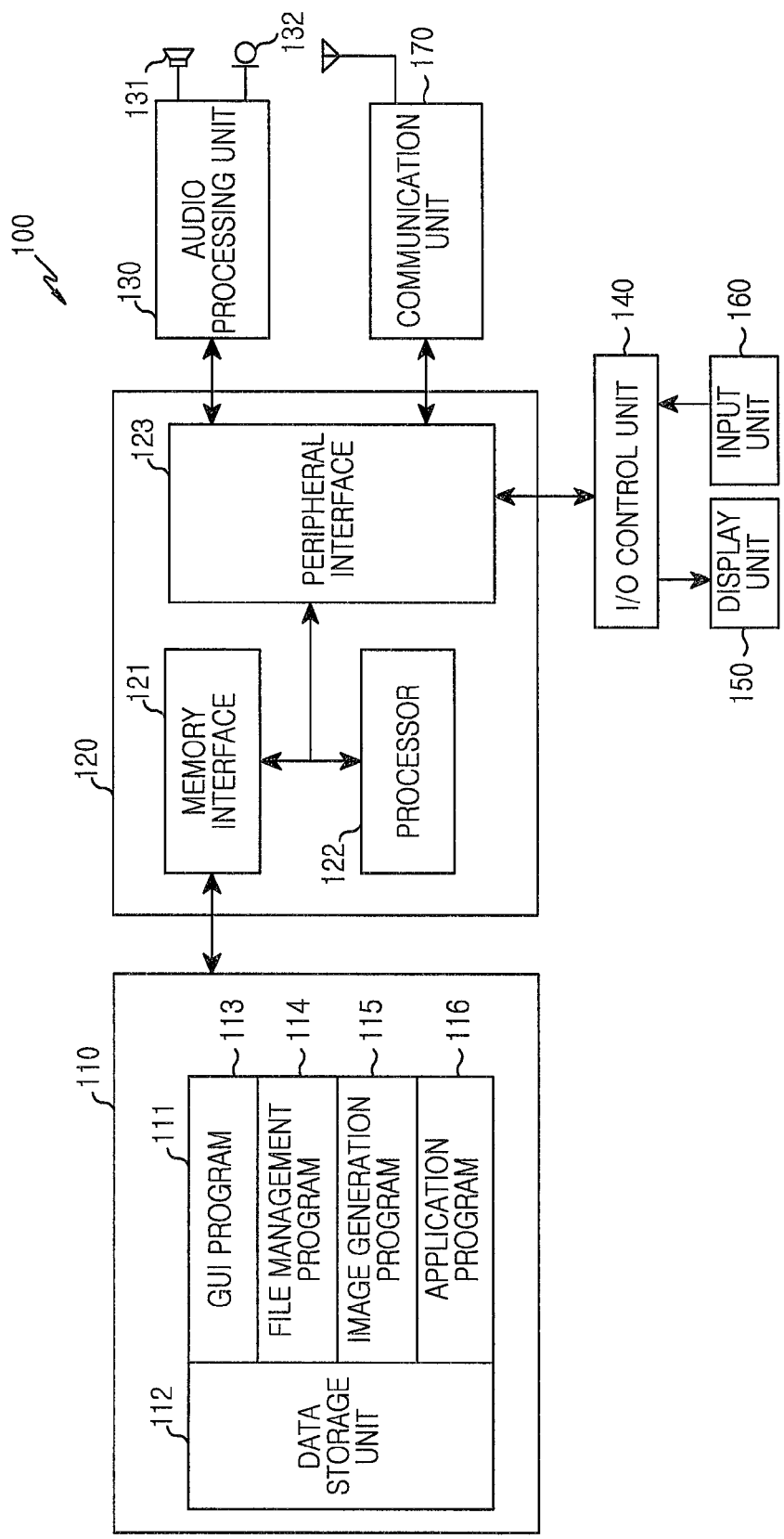
FIG. 1 illustrates a block configuration of an electronic device according to various embodiments of the present disclosure.

FIG. 1 illustrates a block configuration of an electronic device according to various embodiments of the present disclosure.

Referring to FIG. 1, the electronic device 100 may include a memory 110, a processor unit 120, an audio processing unit 130, an input/output control unit 140, a display unit 150, an input unit 160, and a communication system 170. The memory 110 may be provided in plurality.

The respective components will be described below.

The memory 110 may include a program storage unit 111 for storing a program for controlling an operation of the electronic device 100 and a data storage unit 112 for storing data generated during the execution of a program.

The program storage unit 111 includes a Graphic User Interface (GUI) program 113, a file management program 114, an image generation program 115, and at least one application program 116. Herein, the programs stored in the program storage unit 111 may be expressed as an instruction set that is a collection of instructions.

The graphic user interface program 113 includes at least one software component for providing a graphic user interface on the display unit 150. For example, the GUI program 113 may perform control to display information about an application program executed by the processor 122 on the display unit 150. As another example, the GUI program 113 may perform control to display a menu for determining of the number of images to be inserted into a body of an e-mail by the image generation program 115 on the display unit 150. As another example, the GUI program 113 may perform control to display a menu for determining quality of images to be inserted into a body of an e-mail by the image generation program 115 on the display unit 150.

Figure 7A:
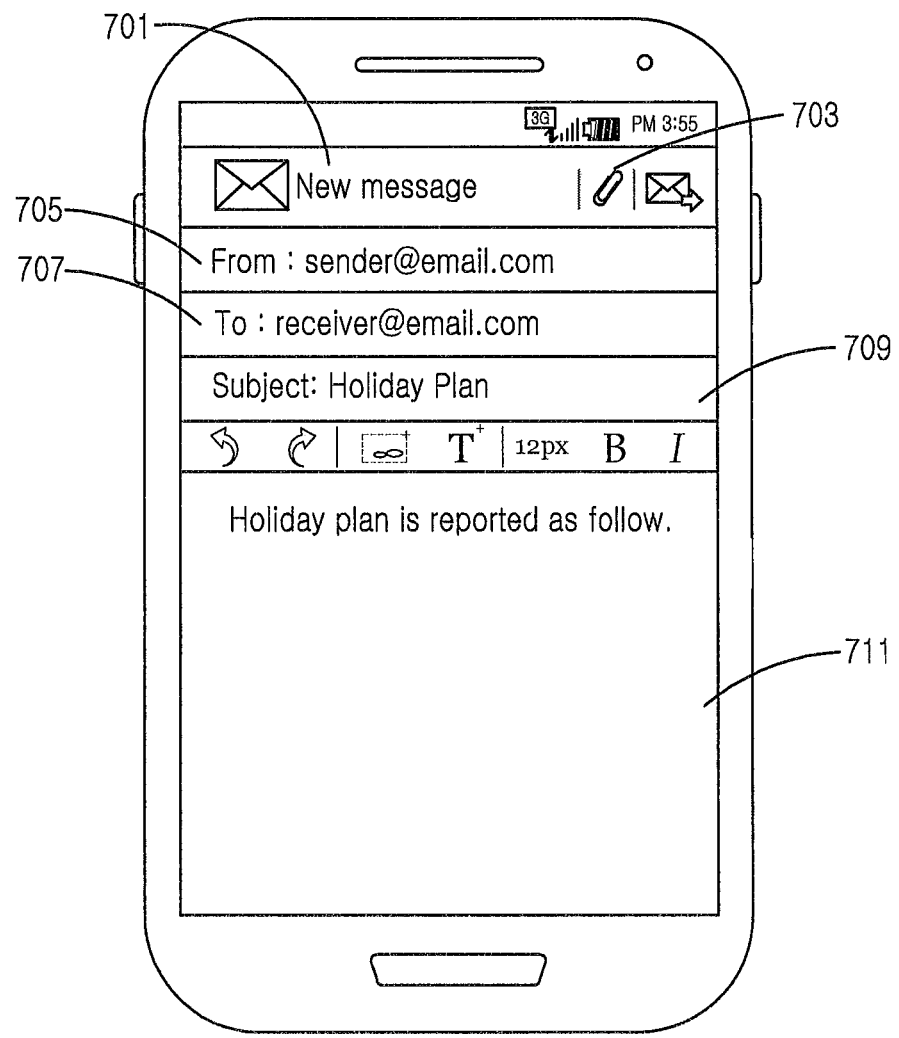
FIGS. 7A to 7E illustrate screen configurations of an electronic device for generating an image corresponding to an attached file and inserting the image into a body of an e-mail in an electronic device according to various embodiments of the present disclosure.
Figure 7B:
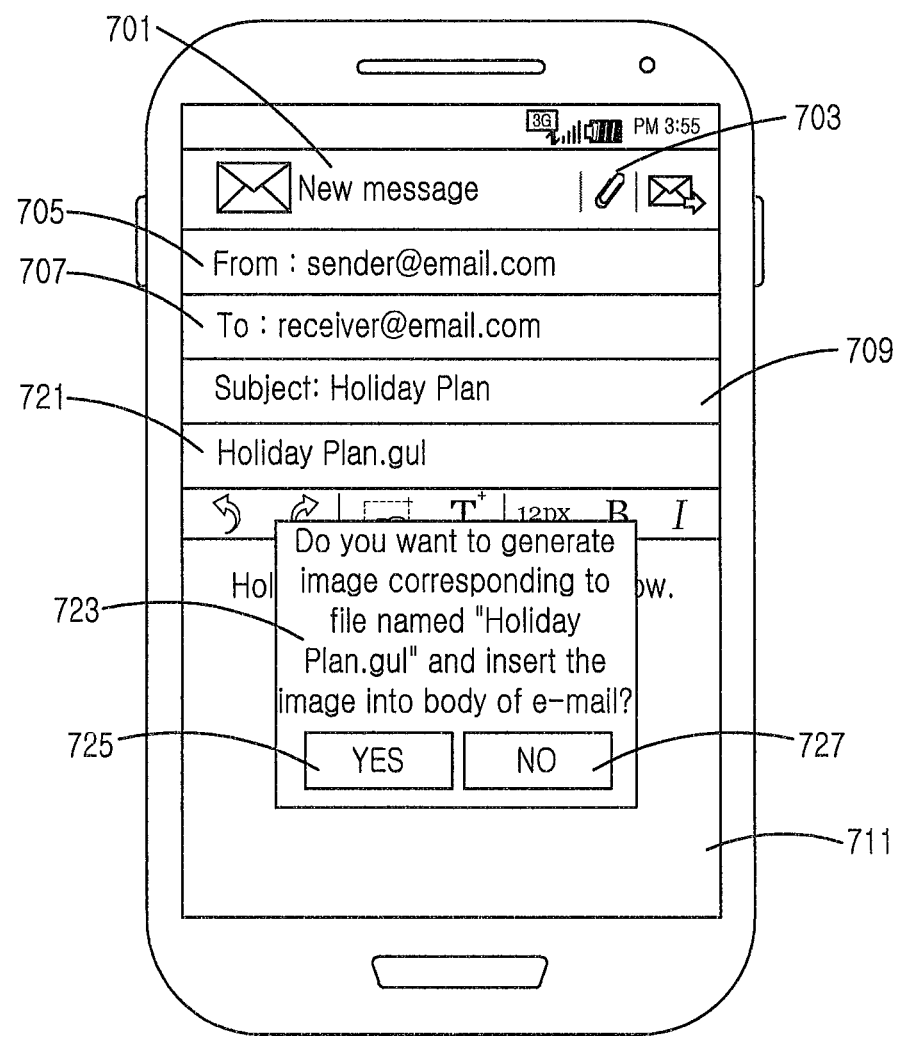

The file management program 114 includes at least one software component for executing an application program corresponding to an attached file when a tile attachment event has occurred. For example, when a file named "holiday plan.gul" 721 is attached as illustrated in FIG. 7B, the file management program 114 determines whether an application program (hereinafter, referred to as a GUL program) for generating an image corresponding to the file named "holiday plan.gul" 721 is being executed, and when the GUL program is not executed, executes the GUL program. In this embodiment, the file management program 114 may perform control to execute the GUL program in the background. When the GUL program is executed, the file management program 114 may configure an application buffer to include display data of the file named "holiday plan.gul" 721.

Figure 7C:
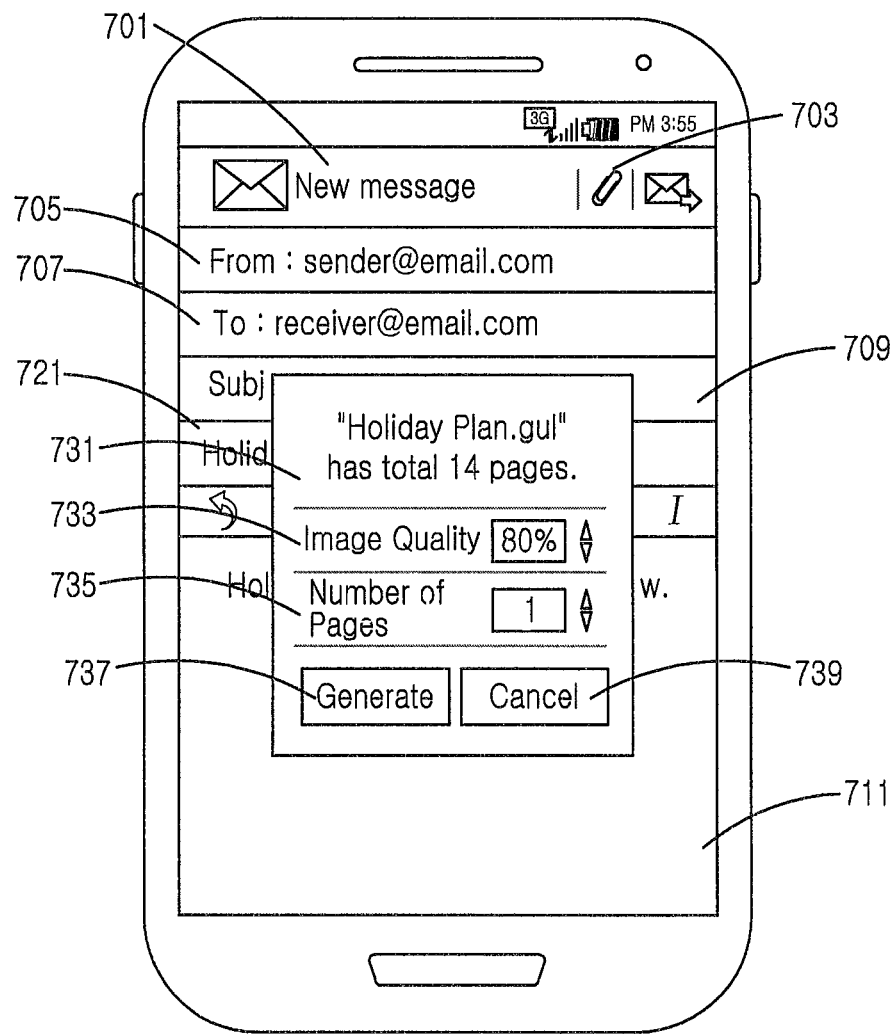
Figure 7D:
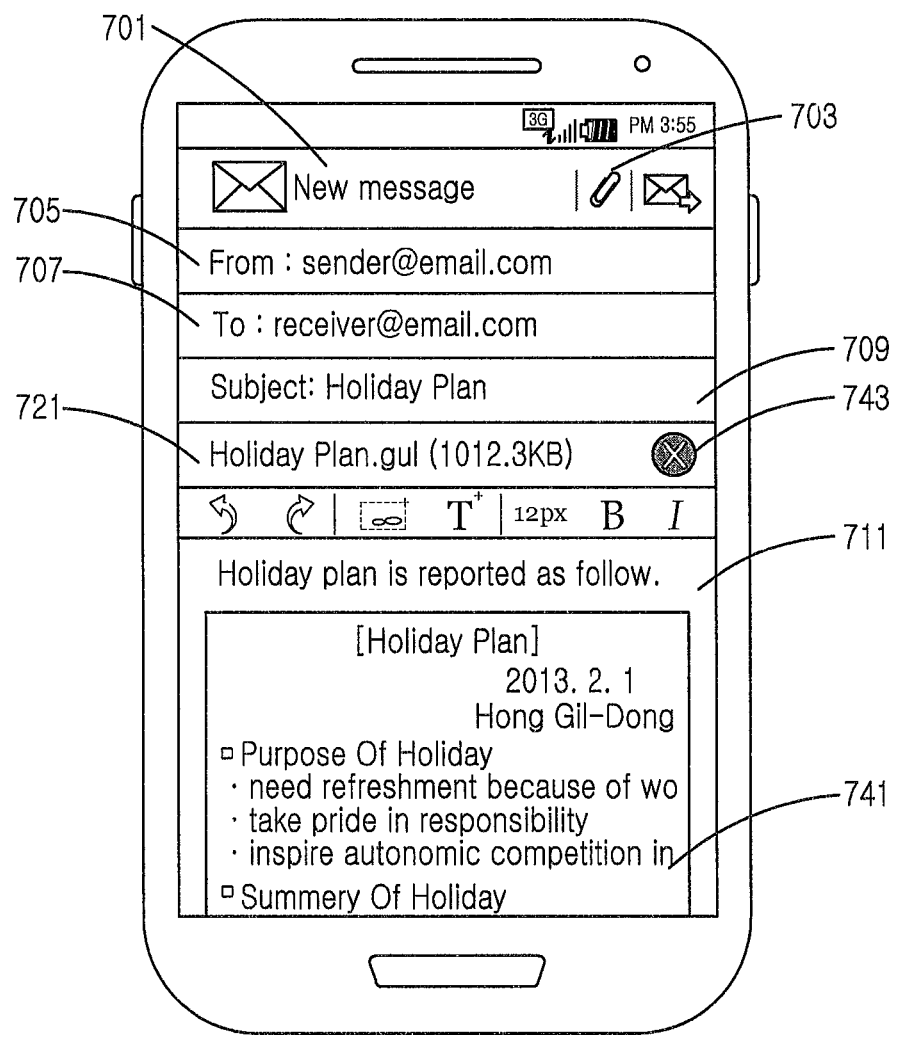

The image generation program 115 includes at least one software component for generating an image corresponding to an attached file. For example, the image generation program 115 may generate a plurality of images in unit of a display buffer with the application buffer configured by the file management program 114. In this embodiment, the image generation program 115 may perform to store the generated image. Thereafter, the image generation program 115 may insert an image 741 into a body 711 of an e-mail as illustrated in FIG. 7D. In addition, the image generation program 115 may set a hyperlink associated with the attached file in the image. The image generation program 115 may insert the image 741 into a text by using optical character recognition (OCR). The image generation program 115 may determine the number of images to be inserted into the body of the e-mail. The image generation program 115 may determine quality of images to be inserted into the body of the e-mail.

The application program 116 includes a software component for at least one application program installed in the electronic device 100.

The processor unit 120 may include a memory interface 121, at least one processor 122, and a peripheral interface 123. In this embodiment, the memory interface 121, the at least one processor 122 and the peripheral interface 123 which are included in the processor unit 120 may be integrated into at least one integrated circuit or be implemented as separate components.

The memory interface 121 controls access to the memory 100 of components, such as the processor 122 or the peripheral interface 123.

The peripheral interface 123 controls connections of the input/output peripherals of the electronic device 100 to the processor 122 and the memory interface 121.

Figure 2:
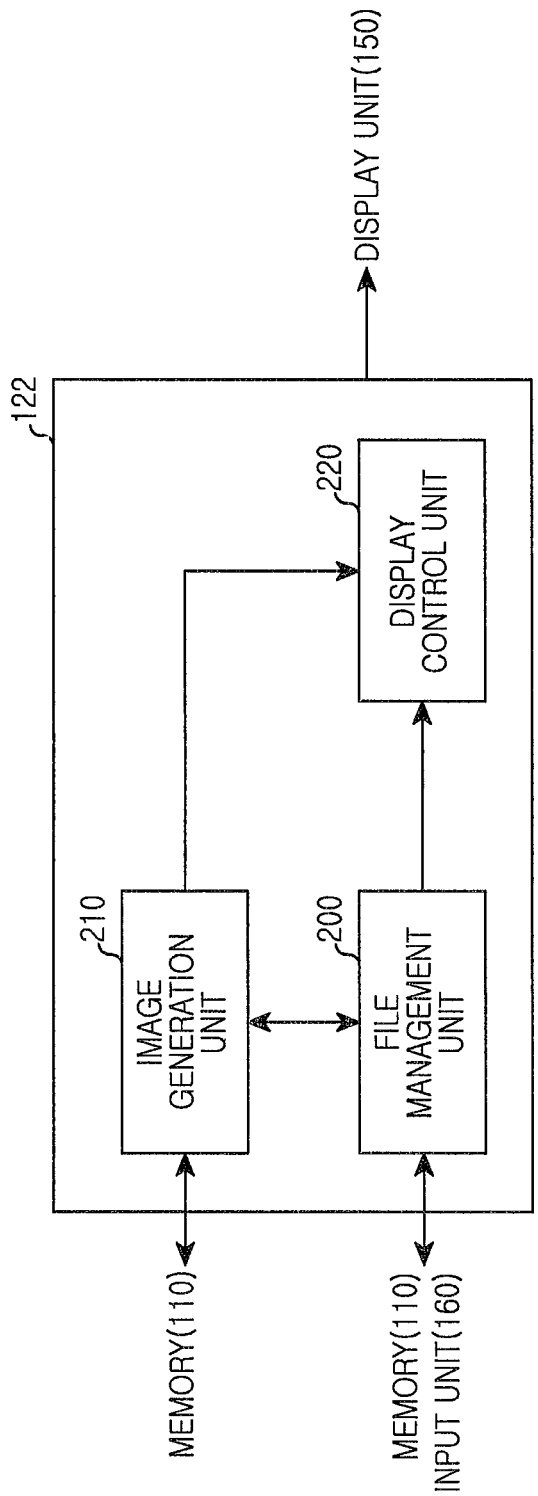
FIG. 2 illustrates a detailed block configuration of a processor according to various embodiments of the present disclosure.

The processor 122 enables the electronic device 100 to provide various services using at least one software program. In this embodiment, the processor 122 may perform control to execute at least one program stored in the memory 110 and provide a service according to the program. For example, the processor 122 may be configured as illustrated in FIG. 2 in order to execute the image generation program 115 to generate an image corresponding to an attached file and insert the image into the body of the e-mail.

The audio processing unit 130 provides an audio interface between a user and the electronic device 100 through a speaker 131 and a microphone 132.

The input/output control unit 140 provides an interface between an input/output device, such as the display unit 150 and the input unit 160, and the peripheral interface 123.

The display unit 150 displays the state information of the electronic device 100, characters input by the user, moving pictures, and still pictures. For example, the display unit 150 may display information about application programs executed by the processor 122. As another example, the display unit 150 may display a menu for determining the number of images to be inserted into the body of the e-mail by the GUI program 113. As another example, the display unit 150 may display a menu for determining quality of images to be inserted into the body of the e-mail by the GUI program 113.

The input unit 160 provides input data generated by a user' selection to the processor unit 120 through the input/output control unit 140. In this embodiment, the input unit 160 may include a keypad including at least one hardware button, a touch pad for detecting touch information, and the like. For example, the input unit 160 may provide touch information detected through the touch pad to the processor 122 through the input/output control unit 140.

The communication unit 170 includes at least one software component for performing communication functions for voice communication and data communication. In this embodiment, the communication unit 170 may be classified into a plurality of communication sub-modules which support different communication networks. For example, the communication networks may include, but not limited to, a Global System for Mobile communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless LAN, a Bluetooth network, and a Near Field Communication (NFC) network.

In addition, the operations of the file management program 114 and the image generation program 115 which are described above may be controlled by application framework. For example, when an image corresponding to an attached file is requested from an e-mail program, the application framework may determine whether an application program (hereinafter, referred to as an image provision application program) for supporting the attached file is being executed. When the image provision application program is not executed, the application framework may execute the image provision application program in background. When the image provision application program is executed, the application framework requests raw data stored in the application buffer of the image provision application program. Thereafter, the application framework may provide, to the e-mail program, the raw data stored in the application buffer of the image provision application program in the unit of the display buffer.

FIG. 2 illustrates a detailed block configuration of a processor according to various embodiments of the present disclosure.

As illustrated in FIG. 2, the processor 122 includes an object control unit 200, an application execution unit 210, and a display control unit 220.

The file management unit 200 executes the file management program 114 stored in the program storage unit 111 to execute an application program corresponding to an attached file. For example, when a file named "holiday plan.gul" 721 is attached as illustrated in FIG. 7B, the file management unit 200 may execute an application program (hereinafter, referred to as a GUL program) for generating an image corresponding to the file named "holiday plan.gul" 721. In this embodiment, the file management unit 200 may perform control to execute the GUL program in background. When the GUL program is executed, the file management unit 200 may configure an application buffer to include display data of the file named "holiday plan.gul" 721.

The image generation unit 210 executes the image generation program 115 of the program storage unit 111 to generate an image corresponding to an attached file. For example, the image generation unit 210 may generate a plurality of images in the unit of a display buffer in the application buffer configured by the file management unit 200. In this embodiment, the image generation unit 210 may perform to store the generated image. Thereafter, the image generation unit 210 may insert an image 741 into body 711 of an e-mail as illustrated in FIG. 7D. In addition, the image generation unit 210 may set a hyperlink associated with the attached file in the image. The image generation unit 210 may insert the image 741 into a text by using optical character recognition (OCR). The image generation unit 210 may determine the number of images to be inserted into the body of the e-mail. The image generation unit 210 may determine quality of images to be inserted into the body of the e-mail.

The display control unit 220 executes the GUI program 113 of the program storage unit 111 to provide a graphic user interface on the display unit 150. For example, the display control unit 220 may perform control to display information about an application program executed by the processor 122 on the display unit 150. As another example, the display control unit 220 may display a menu for determining the number of images to be inserted into the body of the e-mail by the image generation unit 210. As another example, the display control unit 220 may display a menu for determining quality of images to be inserted into the body of the e-mail by the image generation unit 210.

In the above-described embodiment, the image generation unit 210 of the electronic device executes the image generation program 115 of the program storage unit 111 to generate an image corresponding to an attached file.

As another embodiment, the electronic device may include a separate image generation processor including the image generation program 115.

Figure 3:
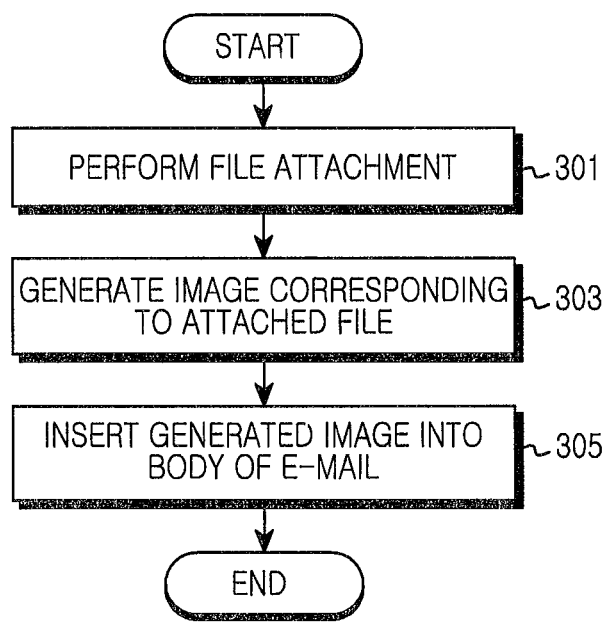
FIG. 3 illustrates a process for generating an image corresponding to an attached file and inserting the image into a body of an e-mail in an electronic device according to an embodiment of the present disclosure.

FIG. 3 illustrates a process for generating an image corresponding to an attached file and inserting the image into body of an e-mail in an electronic device according to an embodiment of the present disclosure.

Referring to FIG. 3, in operation 301, the electronic device attaches at least one file. For example, as illustrated in FIG. 7A, the electronic device may attach at least one file when a file attachment icon 703 is selected during composition of a new message 701 after execution of an e-mail application program. In this embodiment, the new message 701 may include an originator address 705, a recipient address 707, a subject 709 and body 711.

After attaching the file, the electronic device generates an image corresponding to the attached file in operation 303. For example, when a file named "holiday plan.gul" 721 is attached as illustrated in FIG. 7B, the electronic device may execute an application program (hereinafter, referred to as a GUL program) for generating an image corresponding to the file named "holiday plan.gul" 721. In this embodiment, the electronic device may perform control to execute the GUL program in background. When the GUL program is executed, the electronic device may configure an application buffer to include display data of the file named "holiday plan.gul" 721. Thereafter, the electronic device may a plurality of images in the unit of a display buffer in an application buffer. In this embodiment, the electronic device may store the generated image. When the image has been generated, the electronic device may terminate the GUL program.

After generating the image, the electronic device inserts the generated image into body of an e-mail. For example, the electronic device may insert the image 741 into the body 711 of the e-mail as illustrated in FIG. 7D. Additionally, the electronic device may set a hyperlink associated with the file named "holiday plan.gul" 721 in the image 741. Furthermore, the electronic device may insert the image 741 into a text by using optical character recognition (OCR).

Thereafter, the electronic device ends the algorithm.

In the above-described embodiment, the electronic device generates an image corresponding to an attached file and inserts the image into the body of an e-mail.

In another embodiment, the electronic device determines whether an attached file is expressible as an image as illustrated in FIG. 4.

Figure 4A:
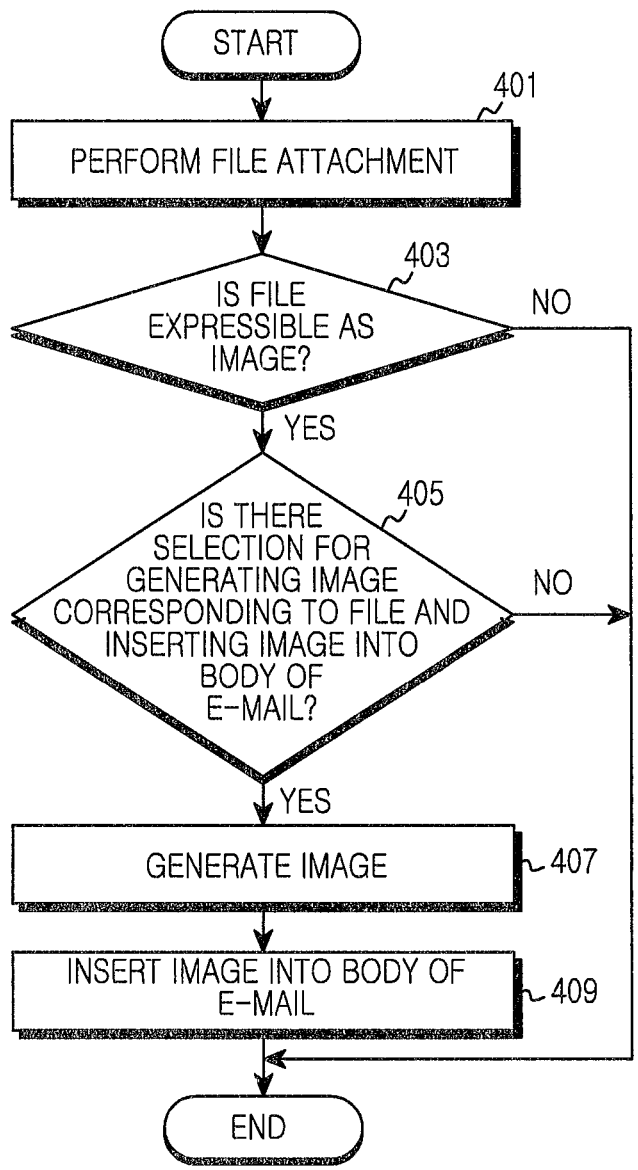
FIGS. 4A and 4B respectively illustrate a process of generating an image corresponding to an attached file and inserting the image to body of an e-mail when the attached file is expressible as an image in an electronic device according to another embodiment of the present disclosure.
Figure 4B:
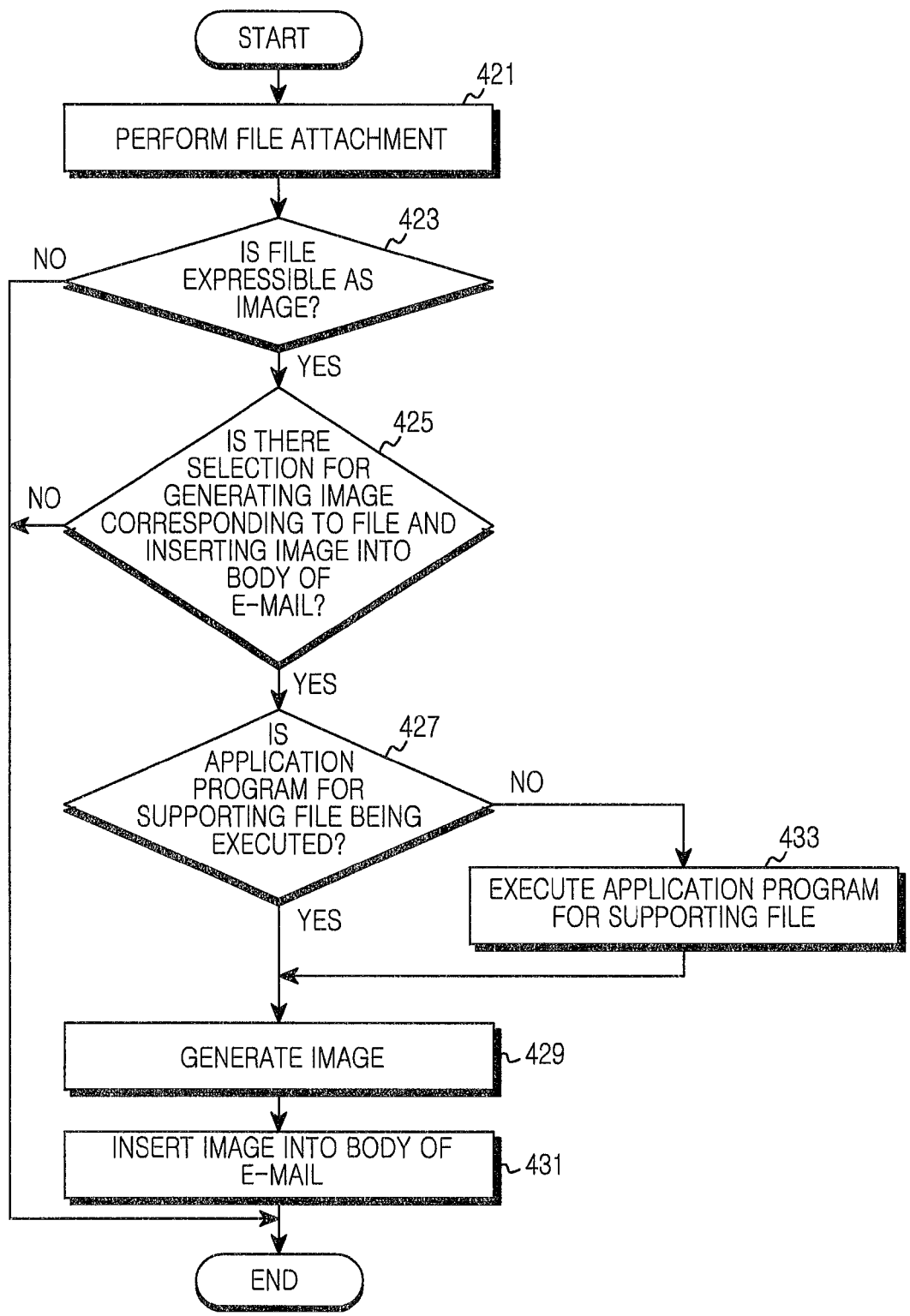

FIGS. 4A and 4B respectively illustrate a process of generating an image corresponding to an attached file and inserting the image into body of an e-mail when the attached file is expressible as an image in an electronic device according to another embodiment of the present disclosure.

Referring to FIG. 4A, in operation 401, the electronic device performs attachment of at least one file. For example, as illustrated in FIG. 7A, the electronic device may performs attachment of at least one file when a file attachment icon 703 is selected during composition of a new message 701 after execution of an e-mail application program. In this embodiment, the new message 701 may include an originator address 705, a recipient address 707, a subject 709 and body 711.

After attaching the file, the electronic device determines whether the attached file is expressible as an image in operation 403. For example, the electronic device may determine whether there is an application program for supporting the extension (for example, doe, xls, ppt, hwp, and gul) of the attached file. For example, when a file named "holiday plan.gul" 721 is attached as illustrated in FIG. 7B, the electronic device may determine whether there is an application program for executing the file named "holiday plan.gul" 721. When the attached file is not expressible as an image, the electronic device may end the algorithm.

Alternatively, when the attached file is expressible as an image, the electronic device determines whether to generate an image and insert the image into the body of an e-mail in operation 405. For example, when the attached file is expressible as an image, the electronic device may display a menu 723 for determining whether to generate an image corresponding to the file and insert the image into the body of the e-mail as illustrated in FIG. 7B. When "No" 727 is selected in the menu 723, the electronic device may recognize that the selection for generating an image corresponding to the file and inserting the image into the body of the e-mail is not detected and end the algorithm.

In addition, when a selection is made to generate an image corresponding to the file and insert the image into the body of the e-mail, the electronic device generates the image corresponding to the file in operation 407. For example, when "Yes" 725 is selected in the menu 723 as illustrated in FIG. 7B, the electronic device may execute an application program (hereinafter, referred to as a GUL program) for generating an image corresponding to the file named "holiday plan.gul" 721. In this embodiment, the electronic device may perform control to execute the GUL program in background. When the GUL program is executed, the electronic device may configure an application buffer to include display data of the file named "holiday plan.gul" 721. Thereafter, the electronic device may a plurality of images in the unit of a display buffer in an application buffer. In this embodiment, the electronic device may store the generated image. When the image has been generated, the electronic device may terminate the GUL program.

After generating the image, the electronic device inserts the image into the body of the e-mail in operation 409. For example, the electronic device may insert the image 741 into the body 711 of the e-mail as illustrated in FIG. 7D. Additionally, the electronic device may set a hyperlink associated with the file named "holiday plan.gul" 721 in the image 741. Furthermore, the electronic device may insert the image 741 into a text by using optical character recognition (OCR).

Thereafter, the electronic device ends the algorithm.

In the above-described embodiment, when an image corresponding to a file is generated and inserted into the body of an e-mail, the electronic device generates the image by executing an application program that supports the file.

In another embodiment, when an image corresponding to a file is generated and inserted into the body of an e-mail as illustrated in FIG. 4B, the electronic device may determine whether an application program for supporting the file is being executed.

Referring to FIG. 4B, in operation 421, the electronic device performs attachment of at least one file. For example, as illustrated in FIG. 7A, the electronic device may performs attachment of at least one file when a file attachment icon 703 is selected during composition of a new message 701 after execution of an e-mail application program. In this embodiment, the new message 701 may include an originator address 705, a recipient address 707, a subject 709 and body 711.

After attaching the file, the electronic device determines whether the attached file is expressible as an image in operation 423. For example, the electronic device may determine whether there is an application program for supporting the extension (for example, doc, xis, ppt, hwp, and gul) of the attached file. For example, when a file named "holiday plan.gul" 721 is attached as illustrated in FIG. 7B, the electronic device may determine whether there is an application program for executing the file named "holiday plan.gul" 721. When the attached file is not expressible as an image, the electronic device may end the algorithm.

Alternatively, when the attached file is expressible as an image, the electronic device determines whether to generate an image and insert the image into the body of an e-mail in operation 425. For example, when the attached file is expressible as an image, the electronic device may display a menu 723 for determining whether to generate an image corresponding to the file and insert the image into the body of the e-mail as illustrated in FIG. 7B. When "No" 727 is selected in the menu 723, the electronic device may recognize that the selection for generating an image corresponding to the file and inserting the image into the body of the e-mail is not detected, and end the algorithm.

In addition, when a selection is made to generate an image corresponding to the file and insert the image into the body of the e-mail, the electronic device determines whether an application program for generating the image corresponding to the file is being executed in operation 427. For example, when "Yes" 725 is selected in the menu 723 for determining whether to generate an image corresponding to the file and insert the image into the body as illustrated in FIG. 7B, the electronic device may determine whether an application program (hereinafter, referred to as a GUL program) for generating the image corresponding to the file named "holiday plan.gul" 721 is being executed.

When the application program for generating an image corresponding to the file is not executed, the electronic device executes the application program that supports the file in operation 433. For example, the electronic device may execute a GUL program for generating an image corresponding to the file named "holiday plan.gul" 721. In this embodiment, the electronic device may perform control to execute the GUL program in background. When the GUL program is executed, the electronic device may configure an application buffer to include display data of the file named "holiday plan.gul" 721. When it is determined that the application program for generating the image corresponding to the file is being executed, the electronic device may configure an application buffer to include display data of the file named "holiday plan.gul" 721.

In operation 429, the electronic device generates the image. For example, the electronic device may generate a plurality of images in the unit of a display buffer in the application buffer of the file named "holiday plan.gul" 721. In this embodiment, the electronic device may store the generated image. When the image has been generated, the electronic device may terminate the GUL program.

After generating the image, the electronic device inserts the image into the body of the e-mail in operation 431. For example, the electronic device may insert the image 741 into the body 711 of the e-mail as illustrated in FIG. 7D. Additionally, the electronic device may set a hyperlink associated with the file named "holiday plan.gul" 721 in the image 741. Furthermore, the electronic device may insert the image 741 into a text by using optical character recognition (OCR).

Thereafter, the electronic device ends the algorithm.

In the above-described embodiment, the electronic device determines whether an attached file is expressible as an image, generates an image corresponding to the file, and inserts the image into the body of an e-mail.

Figure 5A:
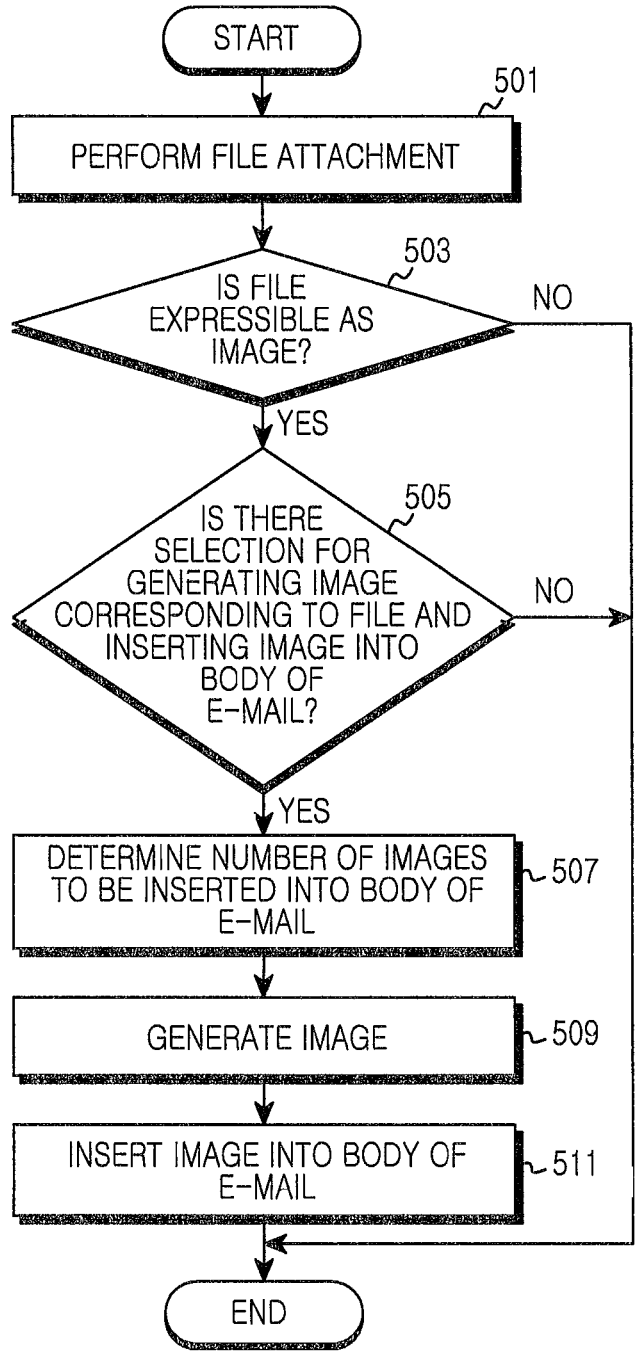
FIGS. 5A and 5B respectively illustrate a process for setting the number of images to be generated when an image corresponding to an attached file is generated in an electronic device according to another embodiment of the present disclosure.
Figure 5B:
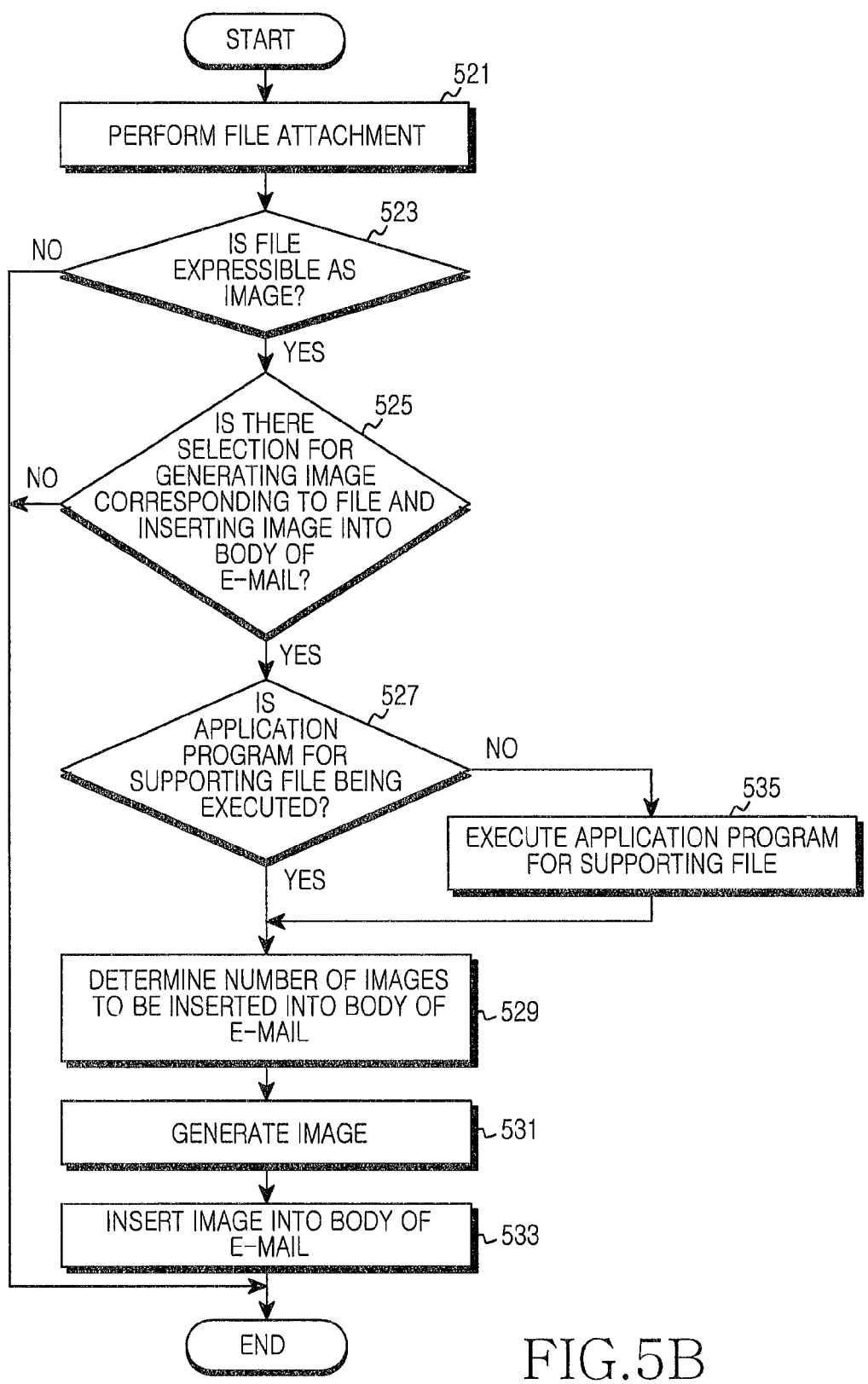

In another embodiment, the electronic device may determine the number of images to be generated when an image corresponding to an attached file is generated as illustrated in FIGS. 5A and 5B.

FIGS. 5A and 5B respectively illustrate a process for setting the number of images to be generated when an image corresponding to an attached file is generated in an electronic device according to another embodiment of the present disclosure.

Referring to FIG. 5A, in operation 501, the electronic device performs attachment of at least one file. For example, as illustrated in FIG. 7A, the electronic device may performs attachment of at least one file when a file attachment icon 703 is selected during composition of a new message 701 after execution of an e-mail application program. In this embodiment, the new message 701 may include an originator address 705, a recipient address 707, a subject 709 and body 711.

After attaching the file, the electronic device determines whether the attached file is expressible as an image in operation 503. For example, the electronic device may determine whether there is an application program for supporting the extension (for example, doe, xis, ppt, hwp, and gul) of the attached file. For example, when a file named "holiday plan.gul" 721 is attached as illustrated in FIG. 7B, the electronic device may determine whether there is an application program for executing the file named "holiday plan.gul" 721. When the attached file is not expressible as an image, the electronic device may end the algorithm.

Alternatively, when the attached file is expressible as an image, the electronic device determines whether to generate an image and insert the image into the body of an e-mail in operation 505. For example, when the attached file is expressible as an image, the electronic device may display a menu 723 for determining whether to generate an image corresponding to the file and insert the image into the body of the e-mail as illustrated in FIG. 7B. When "No" 727 is selected in the menu 723, the electronic device may recognize that the selection for generating an image corresponding to the file and inserting the image into the body of the e-mail is not detected, and end the algorithm.

In addition, when a selection is made to generate an image corresponding to the file and insert the image into the body of the e-mail, the electronic device determines the number of images to be inserted into the body of an e-mail in operation 507. For example, when "Yes" 725 is selected in the menu 723 as illustrated in FIG. 7B, the electronic device may execute an application program (hereinafter, referred to as a GUL program) for supporting the file named "holiday plan.gul" 721. In this embodiment, the electronic device may perform control to execute the GUL program in background. When the GUL program is executed, the electronic device may configure an application buffer to include display data of the file named "holiday plan.gul" 721. Thereafter, the electronic device may display "an image detail setting menu" 731 for determining the number of images to be inserted into the body of the e-mail as illustrated in FIG. 7C. In this embodiment, the electronic device may display a total page number of the file named "holiday plan.gul". In addition, the electronic device may input the number 735 of pages in numbers directly or using buttons. When "Generate" 737 is selected in the "image detail setting menu" 731, the electronic device may determine the number of images. When "Cancel" 739 is selected, the electronic device may terminate the GUL program and end the algorithm.

After determining the number of images, the electronic device generates an image corresponding to the file in operation 509. For example, the electronic device may generate a number of images, which is equal to the determined number, in the unit of a display buffer in an application buffer in operation 507. In this embodiment, the electronic device may store the generated image. When the image has been generated, the electronic device may terminate the GUL program.

After generating the image, the electronic device inserts the image into the body of the e-mail in operation 511. For example, the electronic device may insert the image 741 into the body 711 of the e-mail as illustrated in FIG. 7D. Additionally, the electronic device may set a hyperlink associated with the file named "holiday plan.gul" 721 in the image 741. Furthermore, the electronic device may insert the image 741 into a text by using optical character recognition (OCR). In addition, the electronic device may determine quality 733 of an image to be generated in "the image detail setting menu" 731 as illustrated in FIG. 7C. In addition, the electronic device may input the image quality 739 in numbers directly or using buttons.

Thereafter, the electronic device ends the algorithm.

In the above-described embodiment, when an image corresponding to a file is generated and inserted into the body of an e-mail, the electronic device generates the image by executing an application program that supports the file.

In another embodiment, when an image corresponding to a file is generated and inserted into the body of an e-mail as illustrated in FIG. 5B, the electronic device may determine whether an application program for supporting the file is being executed.

Referring to FIG. 5B, in operation 521, the electronic device performs attachment of at least one file. For example, as illustrated in FIG. 7A, the electronic device may performs attachment of at least one file when a file attachment icon 703 is selected during composition of a new message 701 after execution of an e-mail application program. In this embodiment, the new message 701 may include an originator address 705, a recipient address 707, a subject 709 and body 711.

After attaching the file, the electronic device determines whether the attached file is expressible as an image in operation 523. For example, the electronic device may determine whether there is an application program for supporting the extension (for example, doc, xls, ppt, hwp, and gul) of the attached file. For example, when a file named "holiday plan.gul" 721 is attached as illustrated in FIG. 7B, the electronic device may determine whether there is an application program for executing the file named "holiday plan.gul" 721. When the attached file is not expressible as an image, the electronic device may end the algorithm.

Alternatively, when the attached file is expressible as an image, the electronic device determines whether to generate an image and insert the image into the body of an e-mail in operation 525. For example, when the attached file is expressible as an image, the electronic device may display a menu 723 for determining whether to generate an image corresponding to the file and insert the image into the body of the e-mail as illustrated in FIG. 7B. When "No" 727 is selected in the menu 723, the electronic device may recognize that the selection for generating an image corresponding to the file and inserting the image into the body of the e-mail is not detected, and end the algorithm.

In addition, when a selection is made to generate an image corresponding to the file and insert the image into the body of the e-mail, the electronic device determines whether an application program for generating the image corresponding to the file is being executed in operation 527. For example, when "Yes" 725 is selected in the menu 723 for determining whether to generate an image corresponding to the tile and insert the image into the body as illustrated in FIG. 7B, the electronic device may determine whether an application program (hereinafter, referred to as a GUL program) for generating the image corresponding to the file named "holiday plan.gul" 721 is being executed.

When the application program for generating an image corresponding to the file is not executed, the electronic device executes the application program that supports the file in operation 535. For example, the electronic device may execute a GUL program for generating an image corresponding to the file named "holiday plan.gul" 721. In this embodiment, the electronic device may perform control to execute the GUL program in the background. When the GUL program is executed, the electronic device may configure an application buffer to include display data of the file named "holiday plan.gul" 721. When it is determined that the application program for generating the image corresponding to the file is being executed, the electronic device may configure an application buffer to include display data of the file named "holiday plan.gul" 721.

In operation 529, the electronic device determines the number of images to be inserted into the body of the e-mail. For example, the electronic device may display "an image detail setting menu" 731 for determining the number of images to be inserted into the body of the e-mail as illustrated in FIG. 7C. In this embodiment, the electronic device may display a total page number of the file named "holiday plan.gul". In addition, the electronic device may input the number 735 of pages in numbers directly or using buttons. When "Generate" 737 is selected in the "image detail setting menu" 731, the electronic device may determine the number of images. When "Cancel" 739 is selected, the electronic device may terminate the GUL program and end the algorithm.

After determining the number of images, the electronic device generates an image corresponding to the file in operation 531. For example, the electronic device may generate a number of images, which is equal to the determined number, in the unit of a display buffer in an application buffer in operation 529. In this embodiment, the electronic device may store the generated image. When the image has been generated, the electronic device may terminate the GUL program.

After generating the image, the electronic device inserts the image into the body of the e-mail in operation 533. For example, the electronic device may insert the image 741 into the body 711 of the e-mail as illustrated in FIG. 7D. Additionally, the electronic device may set a hyperlink associated with the file named "holiday plan.gul" 721 in the image 741. Furthermore, the electronic device may insert the image 741 into a text by using optical character recognition (OCR). In addition, the electronic device may determine quality 733 of an image to be generated in "the image detail setting menu" 731 as illustrated in FIG. 7C. In addition, the electronic device may input the image quality 739 in numbers directly or using buttons.

Thereafter, the electronic device ends the algorithm.

In the above-described embodiment, when a file is attached by a first application program (for example, e-mail application program), the electronic device executes a second application program (GUL program) for supporting the attached file to generate an image corresponding to the attached file.

Figure 8:
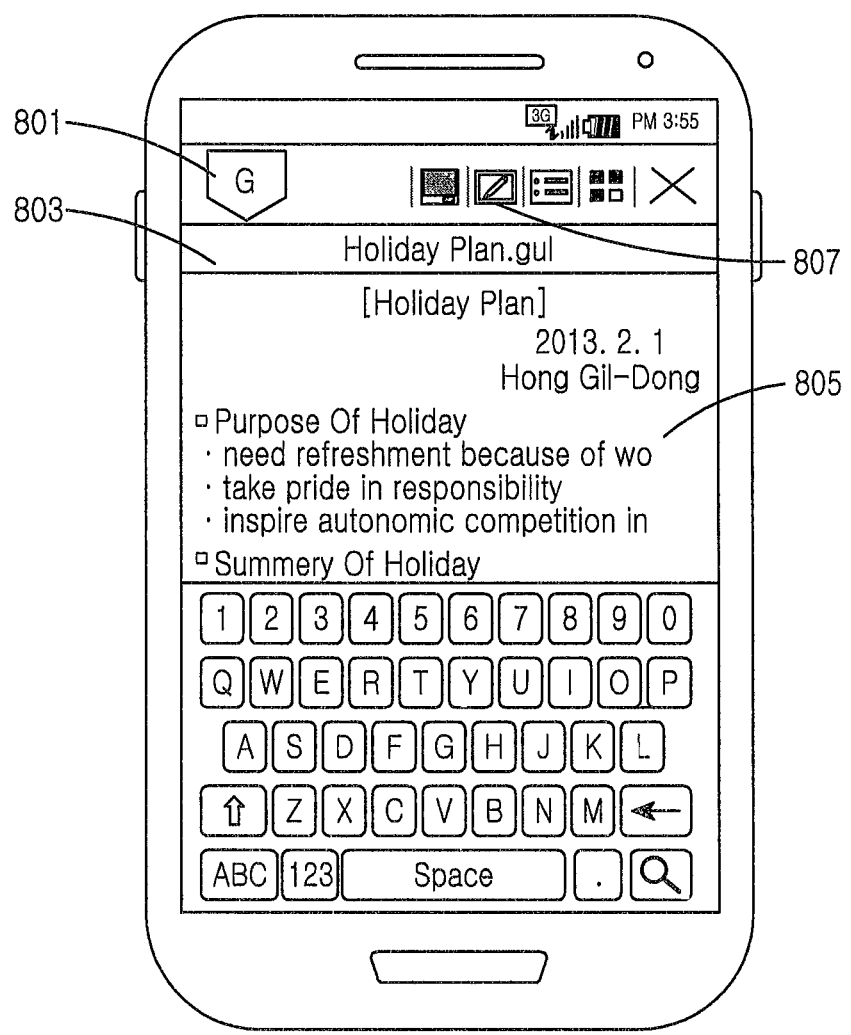
FIG. 8 illustrates a screen configuration of an electronic device for, when a file that is being edited in a first application program is attached to a second application program, generating an image corresponding to the attached file and inserting the image into a body of the second application program in an electronic device according to various embodiments of the present disclosure.

In another embodiment, when a file is attached while a document is being composed through the second application program (GUL program) as illustrated in FIG. 8, the electronic device may attach the file that is being composed by executing the first application program (for example, e-mail application program). In this embodiment, the electronic device may generate an image corresponding to the file that is being composed and provide the image to the first application program. For example, when "Export" 807 is selected during editing of the file named "holiday plan.gul" 803 in the GUL program 801, the electronic device may perform control to attach the file named "holiday plan.gul" 803 to at least one application program (for example, e-mail application program). In this embodiment, the electronic device may generate at least one image from the display data of the file named "holiday plan.gul" 803 configured in an application buffer in the unit of a display buffer. In this embodiment, the electronic device may store the generated image. After generating the image, the electronic device may insert the generated image into the body of the e-mail application program.

Figure 6:
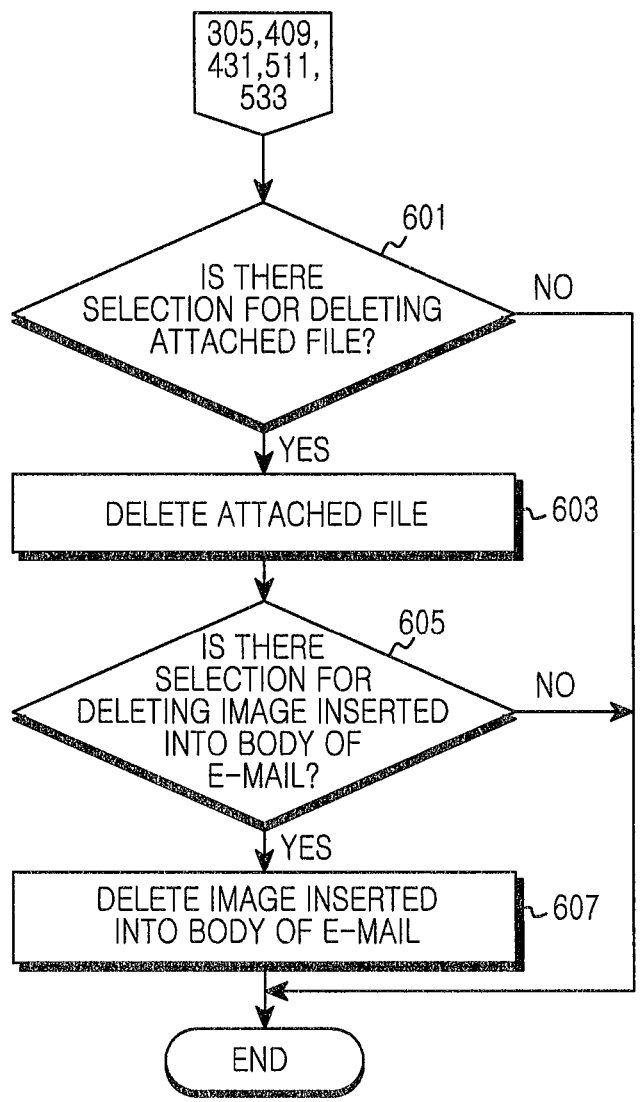
FIG. 6 illustrates a process for maintaining an image in an inserted state into the body of an e-mail when an attached file is deleted after the image is generated corresponding to the attached file and inserted into the body of the e-mail in an electronic device according to another embodiment of the present disclosure.

In another embodiment, when an attached file is deleted as illustrated in FIG. 6, the electronic device determines whether to delete an image inserted into the body of an e-mail.

FIG. 6 illustrates a process for maintaining an image in an inserted state into the body of an e-mail when an attached file is deleted after the image is generated corresponding to the attached file and inserted into the body of the e-mail in an electronic device according to another embodiment of the present disclosure.

Referring to FIG. 6, in operation 601, the electronic device determines whether to delete an attached file. For example, after an image is inserted into the body of an e-mail in operations 305, 409, 511, and 533, the electronic device may determine whether a selection for a menu 743 for deleting an attached file is detected as illustrated in FIG. 7D. If the selection for deleting the attached file is not detected, the electronic device may end the algorithm.

Alternatively, when the selection for deleting the attached file is detected, the electronic device deletes the attached file in operation 603. For example, when the selection for the menu 743 for deleting an attached file is detected as illustrated in FIG. 7D, the electronic device may delete the file named "holiday plan.gul" 721.

Figure 7E:
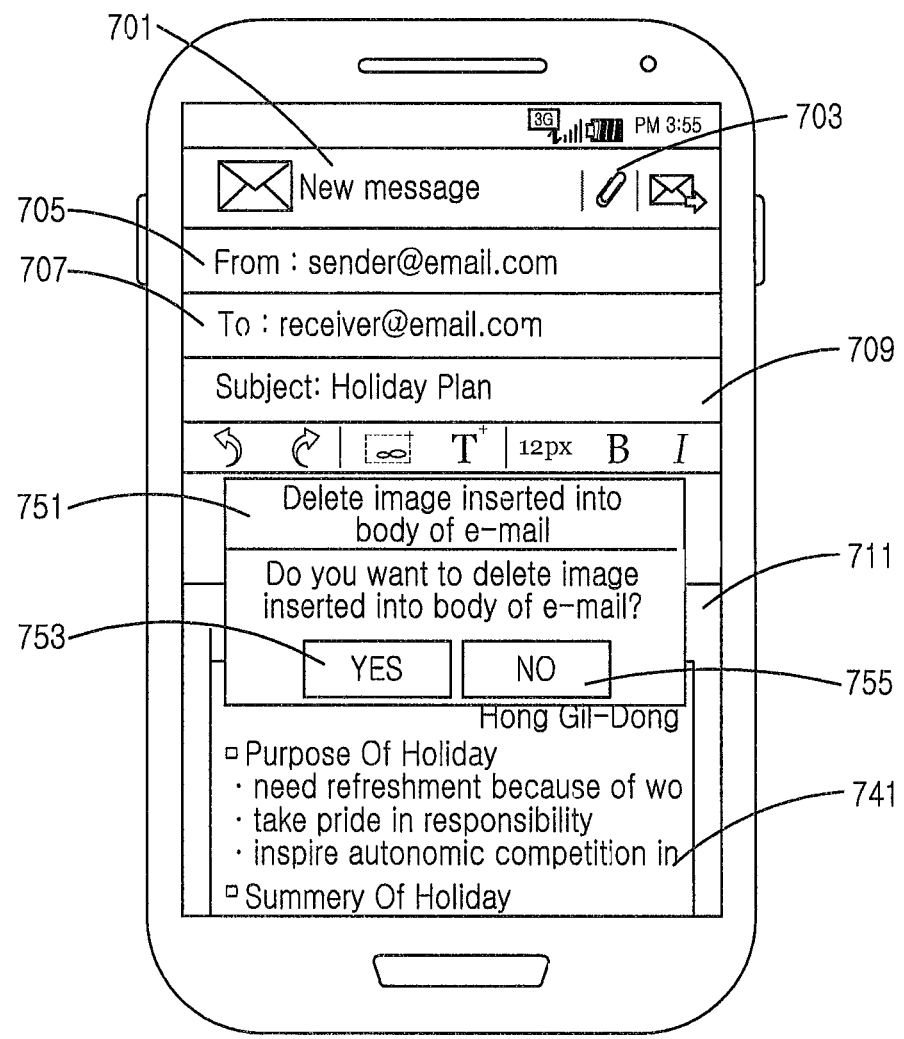

After deleting the attached file, the electronic device determines whether to delete the image inserted into the body of the e-mail in operation 605. For example, when the selection for the menu 743 for deleting an attached file is detected as illustrated in FIG. 7D, the electronic device may display a menu 751 for determining whether to delete the inserted image as illustrated in FIG. 7E. If the selection for deleting an inserted image is not detected, the electronic device may end the algorithm. For example, when "No" 755 is selected in the menu 751 for determining whether to delete an inserted image as illustrated in FIG. 7E, the electronic device may recognize that a selection is made to maintain the image 741 in an inserted state into the body 711 of the e-mail. Therefore, the electronic device may end the algorithm.

Alternatively, when the selection for deleting an image inserted into the body of an e-mail is detected, the electronic device deletes the image inserted into the body of the e-mail in operation 607. For example, when "Yes" 753 is selected in the menu 751 for determining whether to delete an inserted image as illustrated in FIG. 7E, the electronic device may delete the image 741 inserted into the body 711 of the e-mail.

Thereafter, the electronic device ends the algorithm.

Figure 9A:
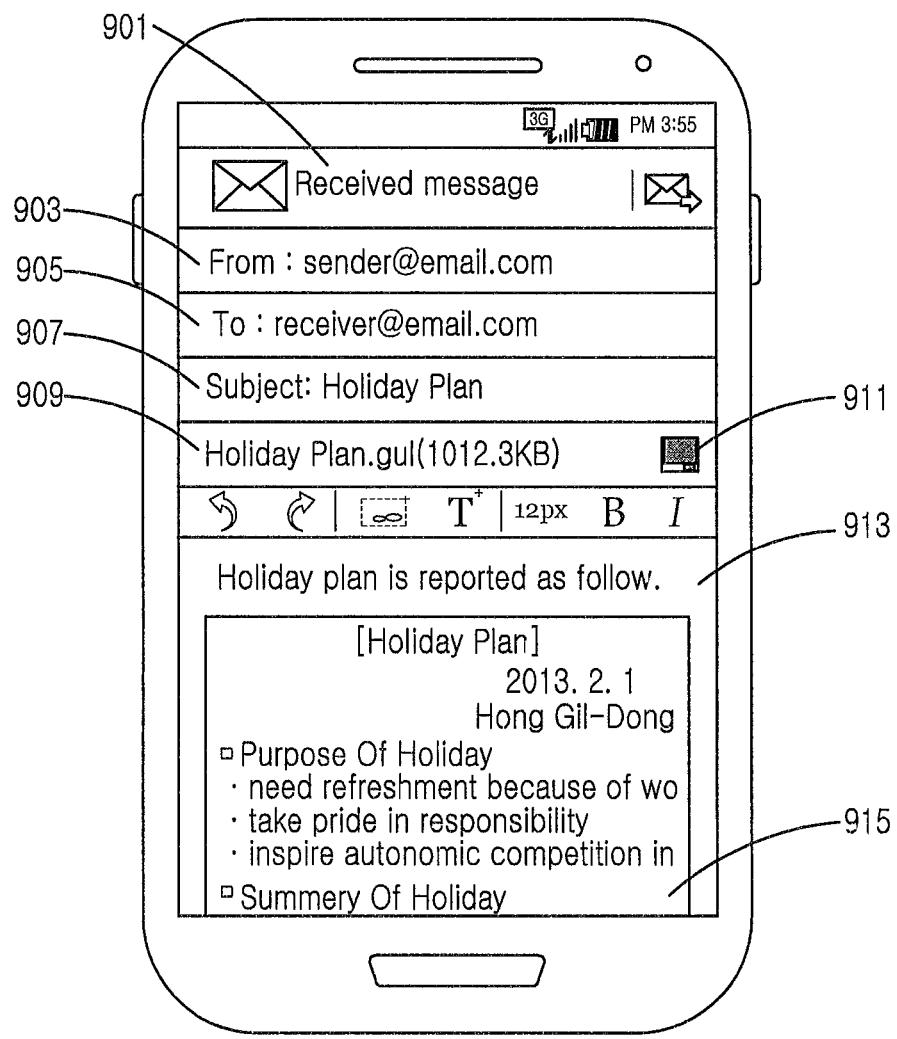
FIGS. 9A and 9B illustrate screen configurations of an electronic device for performing "Store" or "Open" with respect to an attached file when an image included in a received e-mail is selected in an electronic device according to various embodiments of the present disclosure.
Figure 9B:
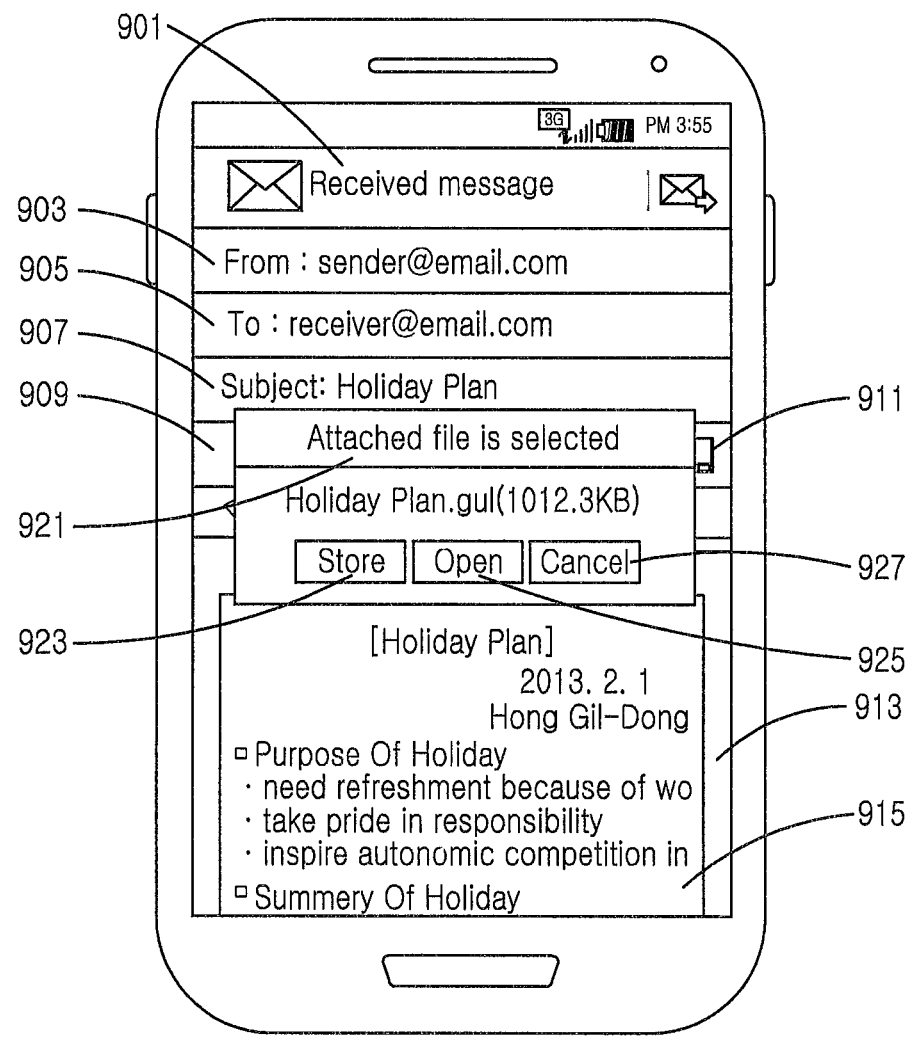

In addition, FIGS. 9A and 9B illustrate screen configurations of an electronic device for performing "Store" 923 or "Open" 925 with respect to an attached file 909 when an image 951 included in a received e-mail 901 is selected in an electronic device (921). In this embodiment, the image included in the e-mail has a hyperlink associated with the attached file 909. In addition, when a selection for the attached file 909 is detected, the electronic device may perform "Store" 923 or "Open" 925 with respect to the attached file 909 like the selection with respect to the image 915.

As described above, when a file is attached to an e-mail, the electronic device generates an image corresponding to the file and inserts the image into the body of the e-mail, thereby allowing an e-mail receipt to easily check the content of the file attached to the e-mail.

While the disclosure has been shown and described with reference to certain disclosure embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method in an electronic device, comprising:
    attaching a file to a first application program during composition of a message after execution of the first application program;
    determining whether a content of the attached file is expressible as an image;
    selecting and executing a second application program from among a plurality of second application programs based on an extension of the attached file in a background when the content of the attached file is expressible as the image;
    generating the image based on the content of the attached file by using the second application program that executes in the background;
    terminating the second application program after generation of the image; and
    inserting and displaying the content of the attached file by the generated image into a body content of the message.

2. The method of claim 1, wherein generating the image corresponding to the attached file comprises:
    determining whether the second application program for supporting an extension of the attached file is being executed;
    executing the second application program in a background when it is determined that the second application program is not being executed; and
    generating the image corresponding the attached file by using raw data of the second application program stored in a buffer.

3. The method of claim 2, wherein generating the image corresponding to the attached file comprises generating the image in a unit of a display buffer in an application buffer of the second application program.

4. The method of claim 2, wherein generating the image corresponding to the attached file comprises:
determining a number of images for generation of the image corresponding to a number of pages in the attached file; and
generating a number of images equal to the determined number corresponding to the number of pages in the attached file.

5. The method of claim 1, wherein generating the image corresponding to the attached file comprises:
determining image quality for generation of the image corresponding to the attached file; and
generating the image corresponding to the attached file according to the image quality.

6. The method of claim 1, wherein inserting the image into the first application program comprises setting a hyperlink associated with the attached file in the image.

7. The method of claim 1, further comprising inserting the image into a text by using optical character recognition (OCR).

8. The method of claim 1, further comprising maintaining the image in an inserted state into the first application program when the attached file is deleted.

9. The method of claim 1, wherein the image includes a number of images corresponding to a number of pages in the attached file.

10. The method of claim 1, wherein the image includes all content of the attached file.

11. An electronic device comprising:
at least one memory; and
at least one processor configured to:
attach a file to a first application program during composition of a message after execution of the first application program;
determine whether a content of the attached file is expressible as an image;
select and execute a second application program from among a plurality of second application programs based on an extension of the attached file in a background when the content of the attached file is expressible as the image;
generate the image based on the content of the attached file by using the second application program that executes in the background;
terminate the second application program after generation of the image; and
insert and display the content of the attached file by the generated image into a body content of the message.

12. The electronic device of claim 11, wherein the processor is further configured to:
determine whether the second application program for supporting an extension of the attached file is being executed;
execute the second application program in a background when it is determined that the second application program is not being executed; and
generate the image corresponding the attached file by using raw data of the second application program stored in a buffer.

13. The electronic device of claim 12, wherein the processor is further configured to generate the image in a unit of a display buffer in an application buffer of the second application program.

14. The electronic device of claim 11, wherein the processor is further configured to:
determine a number of images for generation of the image corresponding to a number of pages in the attached file; and
generate a number of images equal to the determined number corresponding to the number of pages in the attached file.

15. The electronic device of claim 11, wherein the processor is further configured to:
determine image quality for generation of the image corresponding to the attached file; and
generate the image corresponding to the attached file according to the image quality.

16. The electronic device of claim 11, wherein the processor is further configured to set a hyperlink associated with the attached file in the image.

17. The electronic device of claim 11, wherein the processor is further configured to insert the image into a text by using optical character recognition (OCR).

18. The electronic device of claim 11, wherein when the attached file is deleted, the processor is further configured to maintain the image in an inserted state into the first application program.

* * * * *